United States Patent Office 3,314,573
Patented Apr. 18, 1967

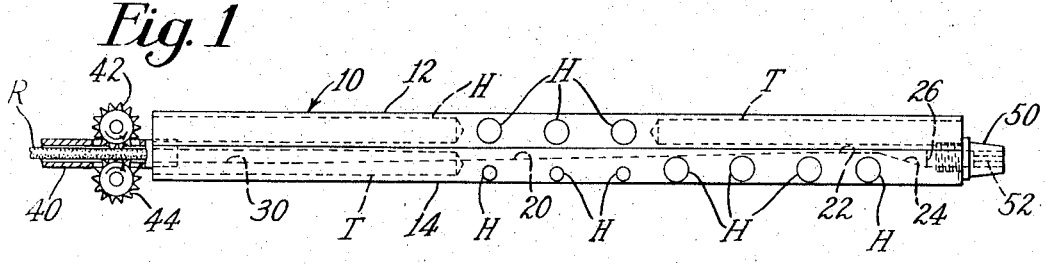
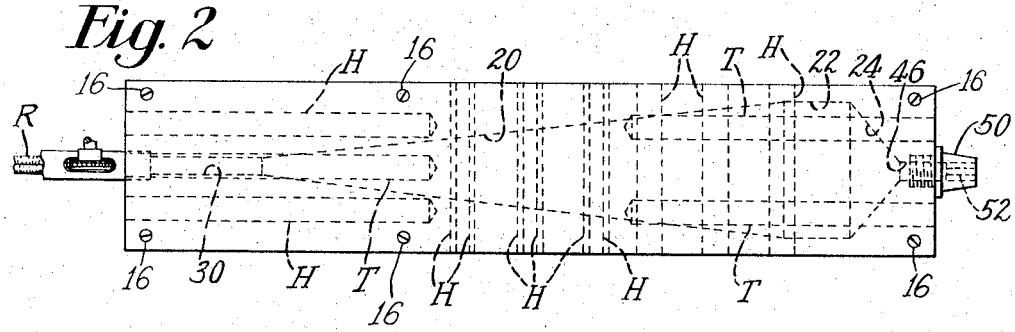
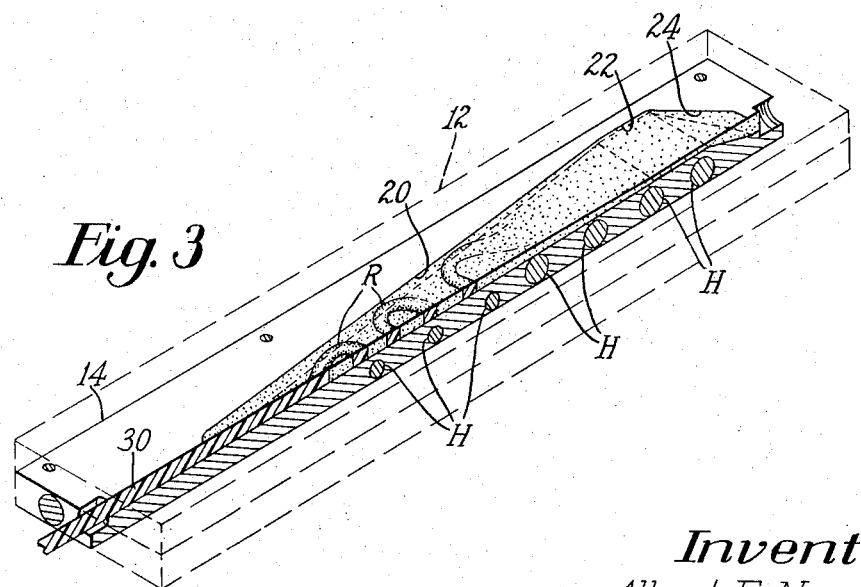
Inventor
Albert E. Newton
By his Attorney

3,314,573
APPARATUS FOR HANDLING THERMOPLASTIC MATERIAL
Albert E. Newton, Beverly, Mass., assignor to United Shoe Machinery Corporation, Flemington, N.J., a corporation of New Jersey
Filed June 7, 1965, Ser. No. 461,649
6 Claims. (Cl. 222—146)

This invention relates to apparatus for handling thermoplastic material in the form of an elongated flexible rod, as disclosed for example in United States Letters Patent No. 2,874,084, issued Feb. 17, 1959, in the name of Hans C. Paulsen.

In the handling of thermoplastic materials, such for example as adhesives, in flexible rod form, it has become a common practice, especially where a relatively large output (grams per minute) is required, to utilize melting and feeding apparatus generally like that disclosed and claimed in United States Letters Patent No. 2,884,922, issued May 5, 1959, in the name of Hans C. Paulsen, this apparatus representing a further development of, and improvement over, the earlier apparatus disclosed and claimed in United States Letters Patent No. 2,765,768, issued Oct. 9, 1959, also in the name of Hans C. Paulsen. While rod adhesive melting and feeding devices of this general type, i.e., employing a power driven melting and feeding disk, or disks, have gone into wide use in adhesive applying apparatus used not only in the shoe industry but also in connection with industrial gluing operations in general, they do involve one somewhat undesirable feature, namely, the rotary disk, or disks, which must be driven by means of a shaft extending outwardly of a housing member and which must be journaled in suitable bearings. In addition to the need for suitable drive mechanism, which is power consuming and which involves extra expense, difficulties also frequently arise in connection with the proper lubrication of the bearings, and especially with the provision of satisfactory and adequate sealing means to prevent leakage of the molten adhesive outwardly along the disk drive shaft.

It is a principal object of this invention to avoid such difficulties by the provision of a novel and improved apparatus for melting and feeding thermoplastic material in rod form which is of utmost simplicity, devoid of moving parts within the melting body, and yet is highly efficient and thoroughly reliable in action. With this object in view, and in accordance with a feature of the invention, in the herein illustrated melting and feeding apparatus which comprises a heated casing formed to provide a heating rod and melting chamber, an inlet passageway leading into one end of the chamber and an outlet passage in communication with the other end of the chamber, and means for feeding the leading end of a solid rod of thermoplastic material through the inlet passageway and into the heating and melting chamber, to facilitate the heating and melting of the leading end of the solid rod, the chamber is so shaped as to present a relatively large surface area for contact by the rod as it is fed thereinto. Thus, while maintaining one dimension of the chamber, hereinafter referred to as its thickness, not substantially greater than the thickness of the rod material, its other dimension, hereinafter referred to as its width, is greatly increased over the thickness of the rod, thereby correspondingly to increase the heated surface area to which the rod is exposed within the chamber. Preferably, and as herein illustrated, this increase in the width of the heating and melting chamber is progressive from the end of the chamber adjacent to the inlet passageway toward the end of the chamber which is in communication with the outlet passageway.

Further to facilitate the transfer of heat from the heated surfaces of the heating and melting chamber, in accordance with another feature of the invention, the thickness of the heating and melting chamber is progressively decreased from the end adjacent to the inlet passageway toward the end in communication with the outlet passageway so that the rod of thermoplastic material as it is fed into the chamber is progressively squeezed into a flattened shape thereby exposing more of the material to the heated walls of the chamber and reducing the distance through which heat must travel to reach the interior of the solid rod and reduce it to molten condition. Preferably, and as herein illustrated, the heating and melting chamber, which at its end adjacent to the inlet passageway is substantially the same size and shape as the solid rod, gradually increases in one dimension (width) while decreasing in its other dimension (thickness).

To insure that the molten material which is extruded from the heating and melting chamber and out through the outlet passageway will be at the proper temperature for use, the heating and melting chamber, in accordance with still a further feature of the invention, is provided with a portion of uniform cross section and of a thickness considerably less than the thickness of the rod material. Preferably, and in the herein illustrated embodiment, this portion of the heating and melting chamber which is adjacent to the end of the chamber which is in communication with the outlet passageway, is of the same cross sectional shape and size as that of the thinner but wider end of the heating and melting chamber. Thus, the material which has been reduced to a molten condition in the heating and melting chamber proper and which is extruded therefrom by the entering solid rod as it is fed into the chamber, will be caused to flow through this relatively thin chamber where additional heat will be transferred hereto before it is extruded out through the outlet passage.

The above and other objects and features of the invention will appear in the following detailed description of the preferred embodiment illustrated in the accompanying drawings, and will be pointed out in the claims.

In the drawings,

FIG. 1 is a plan view of a melting and feeding device embodying the features of this invention;

FIG. 2 is a view in side elevation of the device shown in FIG. 1; and

FIG. 3 is a perspective view, partly in vertical section of a portion of the melting and feeding device with some parts shown in phantom.

Referring to these drawings, the melting and feeding device therein illustrated, which represents a preferred embodiment incorporating the above mentioned features, comprises a body portion, indicated generally by the reference character 10, formed of two elongated rectangular shaped blocks 12, 14 of suitable heat conductive material, such as aluminum, secured together in face-to-face relation by means of screws 16, 16. As shown in FIG. 3, the block 14 which is the lowermost block in FIG. 1, is cut away to present a recess 20 on its side which faces the other block 12, this recess being of generally triangular shape, FIG. 2, and decreasing in depth from left to right where it merges with a relatively shallow recess 22 which leads to a third recess 24. This third recess is also triangular in shape, see FIG. 2, and deepens quite abruptly, see FIG. 1, to an end wall 26. Leading from the outside of the block 14 into the left hand end of the recess 20 is an inlet passageway 30 which, as shown, is of cylindrical cross-section and of a size to receive loosely the leading end of a solid rod R of thermoplastic material, i.e., adhesive, preferably provided with diametrically opposed axial grooves. At its outer end, this passageway is enlarged to receive, with a press fit, one end of a rod guide tube 40 which is cut away, see FIG. 1, to accommodate two feed wheels 42, 44. At the other end of the block 14 there is a passageway 46 leading out of the recess 24 and this passageway has a threaded portion for receiving a discharge nozzle 50 having a discharge orifice 52. Distributed at various locations throughout the blocks 12 and 14 are a number of electrical heaters H, H, H, etc., together with several thermostats T, T, T, for controlling the action of the heaters.

The melting and feeding device which has just been described operates in the following manner. With the electrical heaters turned on the blocks 12 and 14 quickly reach operating temperatures, as determined by the several thermostats. Now, when the feed wheels 42, 44, which are connected to a suitable drive mechanism, not shown, are operated, the leading end of the solid rod R of thermoplastic material will be fed through the inlet passageway 30 and into the heating and melting chamber which is provided by the recess 20 covered by the plate 12. At the point where the inlet passageway opens into this recess, the thickness of the chamber approximately equal to the outside diameter of the rod. Now, as the leading end of the rod is projected further and further into the chamber, which as already noted gradually decreases in thickness and increases in width, it is progressively squeezed down to a flattened and ribbon-like cross-section and is thus presented to an ever increasing area of the opposite walls of the melting chamber, i.e., bottom of the recess 20 and the opposed side face of block 12. Because of the frictional resistance set up between the leading end of the rod R and these walls, and the action of these heated walls on the thermoplastic material, the rod quite probably assumes a sinuous shape, i.e. folded back and forth at right angles to the direction of its forward movement, and these folds become closer together as the right-hand end of the melt chamber is approached, as indicated in FIG. 3.

By the time the thermoplastic material reaches the shallow recess 22 it is already in molten condition although at a lower temperature than that desired for the molten material as it emerges from the discharge nozzle 50. However, as the molten material travels through the narrow passage provided by the recess 22 and block 12, it picks up additional heat from the bottom of the recess 22 and opposed side wall of the block 12 so that it is delivered into the recess 24 at the desired discharge temperature. As the feed wheels continue to feed solid rod into the melt chamber, i.e., recess 20, equal quantities of molten adhesive are caused to flow through the recess 22, which serves as a heat adding zone, into the recess 24 and thence out through the nozzle 50 by the force exerted on the molten material in the melting chamber 20 by the entering solid rod.

As illustrated in FIGS. 2 and 3, the electrical heaters H, H are of different sizes and preferably are specifically located relatively to the progressive squeezing and melting action which occurs in the melting chamber 20, and to the addition of heat in the recess 22, in such a manner as to provide the most efficient and effective use of the electrical energy for melting the solid rod and then additionally heating the molten material without at any time subjecting the material to excessively high and dangerous temperatures. Thus, as the area exposed to the heated walls of the recess 20 increases, the capacity of the electrical heaters likewise increases so that more heat is made available for these larger exposed areas of the thermoplastic material. At the same time the left-hand end of the body portion, in the vicinity of the inlet passage is relatively cool, due to the arrangement and control of the heaters, thus avoiding premature melting of the rod R in passageway 30.

As shown in FIGS. 1 and 2, the discharge nozzle 50 is provided with an orifice 52 which is considerably smaller in diameter than the inlet passage 30. This arrangement is illustrative of one possible use of the melting and feeding device where the nozzle 50 is to be used to apply a narrow band or bead of molten material (e.g., adhesive) continuously to a moving workpiece, for example a travelling web, not shown. It will be understood, however, that instead of such direct application of the molten material, the discharge nozzle 50 may be replaced by a suitable fitting for attachment to a heated hose for conducting the molten material to some other sort of applying device such, for example, as the reservoir of a roll type applicator.

Regardless of the particular use to which the melting and feeding device of this invetion is applied, it enjoys the definite advantages of extreme simplicity coupled with a very efficient heating and melting action obtained, without any moving parts in the melting chamber, as a result of providing a large surface area of the heating and melting chamber for engagement by the solid rod and by squeezing the rod into a flattened condition by the gradually decreased thickness of the melt chamber 20, thus to expose more of the solid rod to heat emanating from the walls of the chamber, i.e., the bottom of the recess 20 and opposed face of the block 12. Also, by the provision of a portion of the melting chamber, i.e., the recess 22, the temperature of the already molten adhesive can be raised to a point to assure a proper operating temperature of the material as it emerges from the nozzle 50 or is delivered to another point of use.

Having described the invention, what is claimed as new and desired to secure by United States Letters Patent is:

1. Apparatus for melting and feeding thermoplastic material in rod form comprising a casing formed to provide a heating and melting chamber, an inlet passageway leading into one end of said chamber and an outlet passageway in communication with the other end of said chamber, said chamber being generally rectangular in cross section of a thickness not substantially greater than the rod material and of a width considerably greater than the rod material thereby to present a large surface area to the leading end of a rod of thermoplastic material as it is fed into the chamber, means for heating the casing and hence the walls of said chamber, and means for feeding a rod of thermoplastic material through the inlet passageway and into said charmber to cause the leading end of the rod progressively to be heated and rendered molten within the chamber and molten material to be extruded from the chamber and through the outlet passageway by the force exerted on the molten material in said chamber by the entering solid rod.

2. Apparatus for melting and feeding thermoplastic material in rod form comprising a casing formed to provide a heating and melting chamber, an inlet passageway leading into one end of said chamber and an outlet passageway in communication with the other end of said chamber, said chamber having a first portion adjacent to the inlet passageway of generally rectangular cross section of a thickness not substantially greater than the rod material and of a width considerably greater than the rod material thereby to present a large surface area to the leading end of a rod of thermoplastic material as it is fed into the chamber and a second portion, adjacent to the outlet passageway of the same width as the first portion but of a thickness much less than that of the rod, means for heating the casing and hence the walls of said chamber, and means for feeding a rod of thermoplastic material through the inlet passageway and into said chamber to cause the leading end of the rod progressively to be heated and rendered molten within the chamber and molten material to be extruded from the first portion of said chamber through the second portion of the chamber and the outlet passageway by the force exerted on the molten material in said chamber by the entering solid rod.

3. Apparatus for melting and feeding thermoplastic material in rod form comprising a casing formed to provide a heating and melting chamber, an inlet passageway leading into one end of said chamber and an outlet passageway in communication with the other end of said chamber, said chamber being generally rectangular in cross section of substantially the same thickness as the rod, adjacent to the inlet passageway, and progresively increasing in width toward the outlet passageway to present a larger surface area to the leading end of the rod as it is fed into said chamber, means for heating the casing and hence the walls of said chamber, and means for feeding a rod of thermoplastic material through the inlet passageway and into said chamber to cause the leading end of the rod progresively to be heated and rendered molten within the chamber and molten material to be extruded from the chamber and through the outlet passageway by the force exerted on the molten material in said chamber by the entering solid rod.

4. Apparatus for melting and feeding thermoplastic material in rod form comprising a casing formed to provide a heating and melting chamber, an inlet passageway leading into one end of said chamber and an outlet passageway in communication with the other end of said chamber, said chamber being generally rectangular in cross section of substantially the same width and thickness as the rod adjacent to the inlet passageway and progressively increasing in width and decreasing in thickness toward the outlet passageway to present a larger surface area and a narrower passageway to the leading end of the rod as it is fed into the chamber, means for heating the casing and hence the walls of said chamber, and means for feeding a rod of thermoplastic material through the inlet passageway and into said chamber to cause the leading end of the rod progresively to be heated, squeezed into a flattened shape and rendered molten within the chamber and molten material to be extruded from the chamber and through the outlet passageway by the force exerted on the molten material in said chamber by the entering solid rod.

5. Apparatus for melting and feeding thermoplastic material in rod form comprising a casing formed to provide a heating and melting chamber, an inlet passageway leading into one end of said chamber and an outlet passageway in communication with the other end of said chamber, said chamber having a first portion adjacent to the inlet passageway of generally rectangular cross section substantially the same thickness as the rod adjacent to the inlet passageway and progressively increasing in width toward the outlet passage to present a larger surface area to the leading end of the rod as it is fed into said chamber, and a second portion, adjacent to the outlet passageway, of the same width as the first portion but of a thickness much less than that of the rod, means for heating the casing and hence the walls of said chamber, and means for feeding a rod of thermoplastic material through the inlet passageway and into said chamber to cause the leading end of the rod progresively to be heated and rendered molten within the chamber and molten material to be extruded from the first portion of said chamber and through the second portion of chamber and the outlet passageway by the force exerted on the molten material in said chamber by the entering solid rod.

6. Apparatus for melting and feeding thermoplastic material in rod form comprising a casing formed to provide a heating and melting chamber, an inlet passageway leading into one end of said chamber and an outlet passageway in communication with the other end of said chamber, said chamber having a first portion, adjacent to the inlet pasageway, generally rectangular in cross section and of substantially the same width and thickness as the rod adjacent to the inlet passageway, and progressively increasing in width and decreasing in thickness toward the outlet passageway, to present a larger surface area and a narrower pasageway to the leading end of the rod as it is fed into the chamber, and a second portion, adjacent to the outlet passageway of the same width as the adjacent end of the first portion but of a thickness much less than that of the rod, means for heating the casing and hence the walls of said chamber, and means for feeding a rod of thermoplastic material through the inlet passageway and into said chamber to cause the leading end of the rod progressively to be heated, squeezed into a flattened shape, and rendered molten within the first portion of said chamber and molten material to be extruded from said first portion of the chamber and through the second portion thereof and the outlet passageway by the force exerted on the molten material in said chamber by the entering solid rod.

References Cited by the Examiner

UNITED STATES PATENTS

| | | | |
|---|---|---|---|
| 1,449,517 | 3/1923 | Lame | 120—116 |
| 1,931,247 | 10/1933 | Brown | 165—147 X |
| 2,740,803 | 4/1956 | Dorschner | 165—147 X |
| 2,884,922 | 5/1959 | Paulsen. | |
| 3,175,962 | 3/1965 | Holtslag | 165—147 X |

RAPHAEL M. LUPO, *Primary Examiner.*